United States Patent [19]

Kudo

[11] Patent Number: 5,220,666
[45] Date of Patent: Jun. 15, 1993

[54] CONTROL METHOD IN PROGRAMMABLE CONTROLLER

[75] Inventor: Kazuhiko Kudo, Tokyo, Japan

[73] Assignee: Koyo Electronics Industries Co., Ltd., Tokyo, Japan

[21] Appl. No.: 872,460

[22] Filed: Apr. 23, 1992

[30] Foreign Application Priority Data

Feb. 13, 1992 [JP] Japan .................................. 4-025594

[51] Int. Cl.[5] .......................... G06F 9/22; G06F 9/45
[52] U.S. Cl. ............................... 395/700; 364/926.93; 364/926.9; 364/973; 364/DIG. 2
[58] Field of Search .......................... 395/700, 650

[56] References Cited

U.S. PATENT DOCUMENTS 4,309,756 1/1982 Beckler ............................... 364/300
5,067,068 11/1991 Iwasawa et al. ..................... 395/650

Primary Examiner—Gareth O. Shaw
Assistant Examiner—A. Katbab
Attorney, Agent, or Firm—Sughrue, Mion, Zinn, Macpeak & Seas

[57] ABSTRACT

A sequence control process includes an input/output transfer process and an operation process of a programmable controller program. At least one of an execution procedure of the input/output transfer process and a programmable controller program is generated in advance in the form of a machine language program that which can directly be executed by the central processing unit, and stored into a RAM. Then, the sequence control process is cyclically performed by the central processing unit based on the stored machine language program.

4 Claims, 5 Drawing Sheets

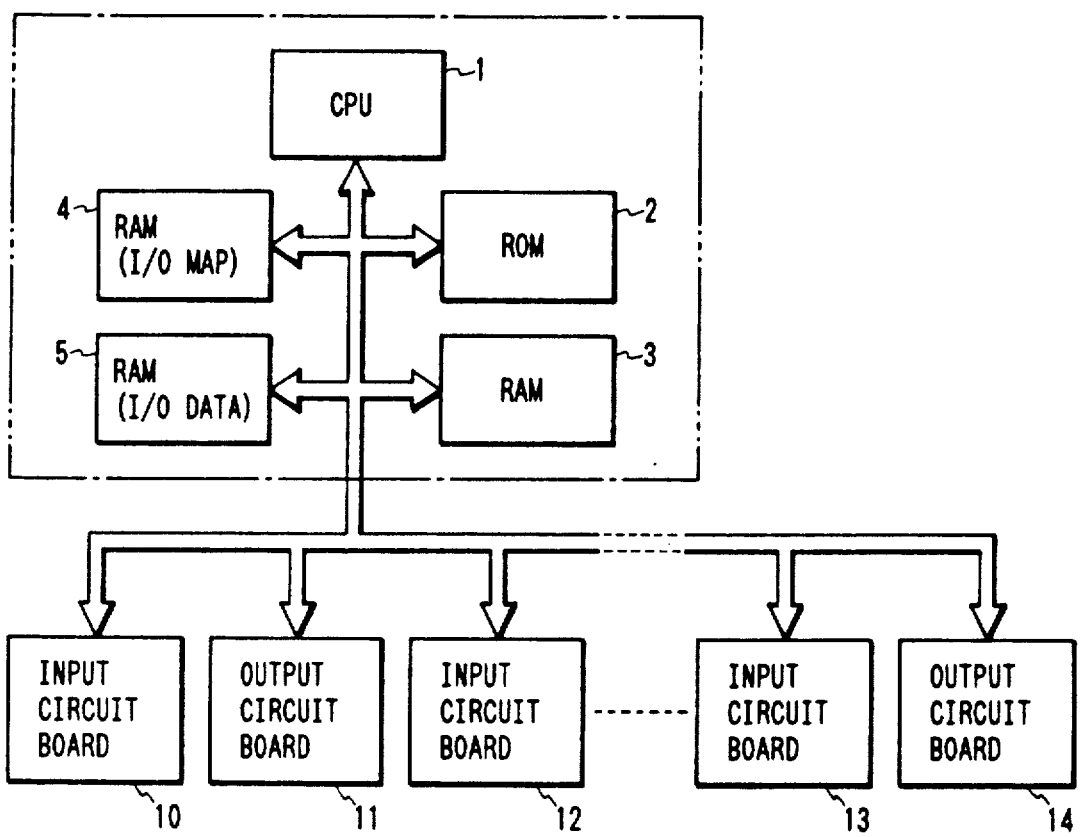

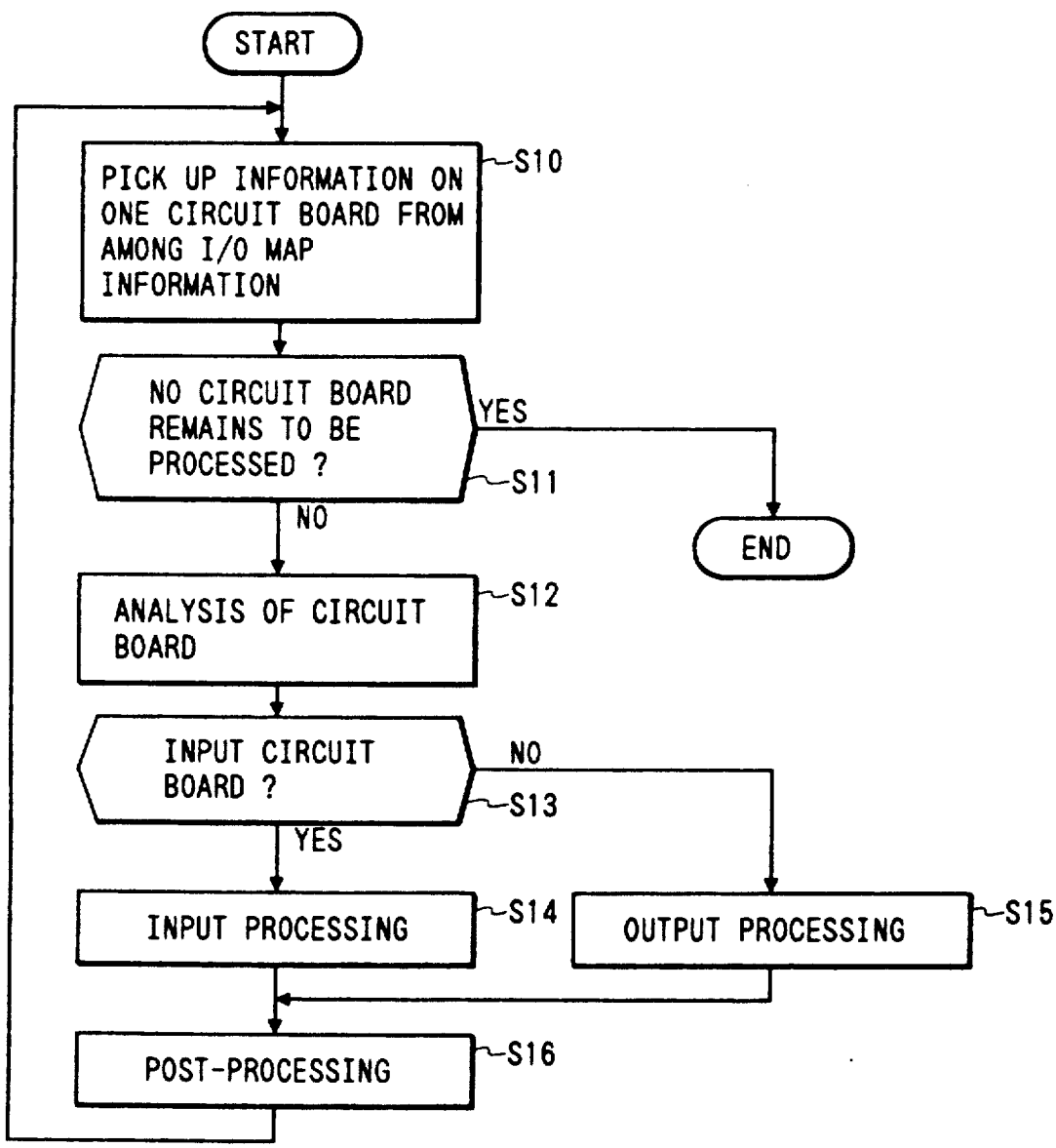

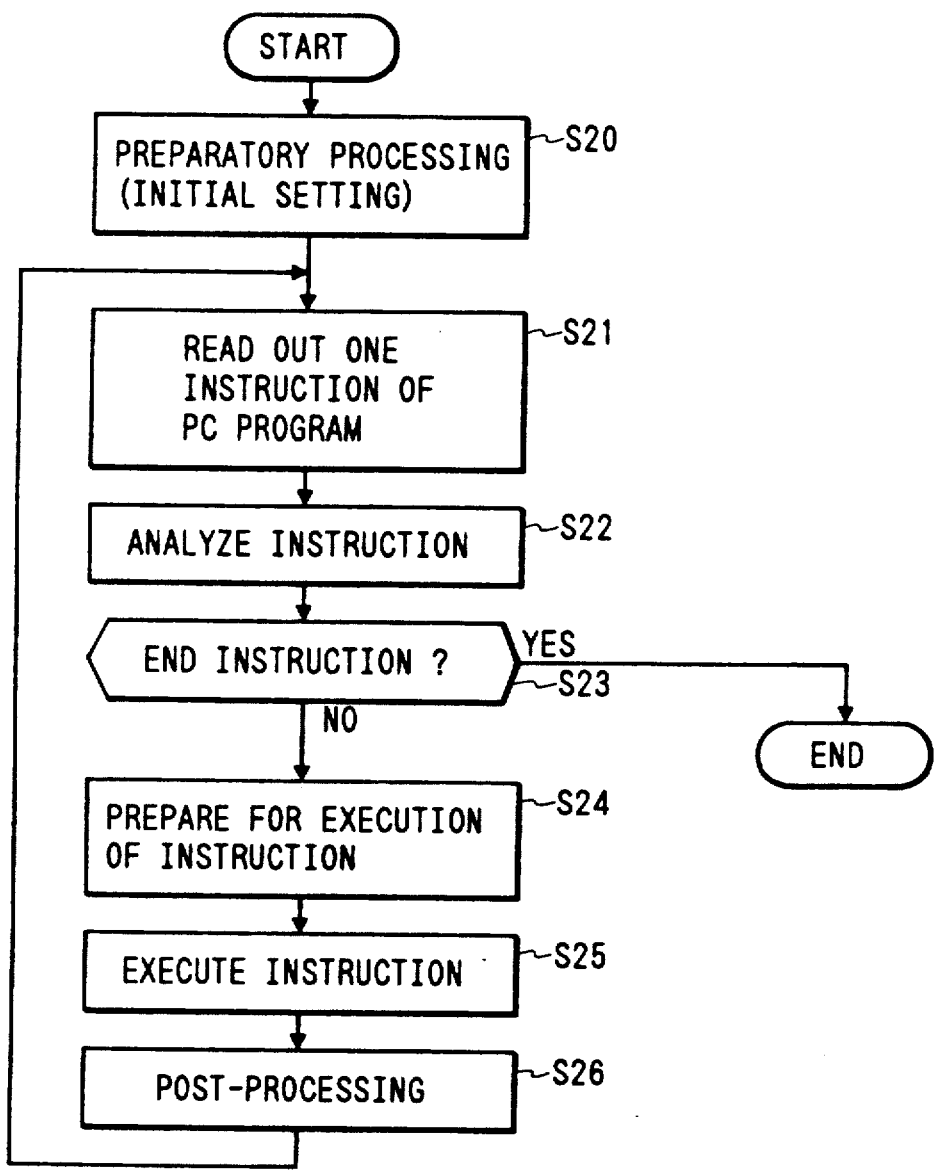

CONTROL METHOD IN PROGRAMMABLE CONTROLLER

BACKGROUND OF THE INVENTION

The present invention relates to a control method in a programmable controller and, more specifically, to an improvement of a processing speed of a programmable controller.

FIG. 5 is a flowchart showing a process performed while a conventional programmable controller (hereinafter abbreviated to "PC") is running. As shown, a sequence control process is repeatedly performed which consists of I/O transfer (S1) and execution of a PC program (S2).

FIG. 6 is a flowchart showing details of the I/O transfer process, in which input state information is received from an input circuit board connected to the PC and execution results of a PC program is sent to an output circuit board. In step S10, information on one circuit board is picked up from among I/O map information (i.e., information on circuit boards connected to the PC) stored in a memory device of the PC. Then, it is judged in step S11 whether no circuit board remains to be processed. If a circuit board (or boards) remains, the kind of the above-picked-up circuit board is analyzed in step S12, and it is judged in step S13 whether the circuit board is an input circuit board or not. If the judgment is affirmative, in step S14 input processing is performed to receive input state information from the input circuit board. On the other hand, if the judgment is negative, i.e., if the circuit board is an output circuit board, in step S15 output processing is performed to provide execution results of a PC program to the picked-up output circuit board. After completion of the input processing or output processing, in step S16 post-processing is performed to renew a read address of the I/O map information, and the process returns to step S10. In this manner, the input processing or output processing is performed for all the circuit boards based on the judgment on the kind of the respective circuit boards, that is, until the judgment of step S11 turns affirmative.

FIG. 7 is a flowchart showing details of the PC program execution process, in which a user-made, sequence control user program is executed. Preparatory processing such as initial setting is first performed in step S20. Then, one instruction of the PC program is read from the memory device in step S21, and analyzed in step S22. Then, it is judged in step S23 whether the instruction is an end instruction. If the judgment is negative, a preparation for execution of the readout instruction is performed in step S24, and the instruction is actually executed in step S25. Finally, post-processing is performed to renew a read address of the PC program in step S26, and the process returns to step 21. The above process is repeated until it is judged that the end instruction has been read in step S23.

However, if one examines the details of the above I/O transfer process and the PC program execution process performed in conventional PCs, he can find that processes other than those absolutely required in the sequence control, i.e., the I/O process and instruction executing process, are also performed. This will unavoidably necessitate an additional processing time.

SUMMARY OF THE INVENTION

The present invention has been made in view of the above problem in the art, and has an object of providing a control method in a programmable controller (PC) which can reduce a processing time of sequence control.

According to the invention, a control method in a programmable controller in which a sequence control process including an input/output transfer process and an operation process of a programmable controller program is cyclically performed, comprises the steps of:

generating at least one of an execution procedure of the input/output transfer process and the programmable controller program in the form of a machine language program which can directly be executed by a central processing unit;

storing the machine language program into a memory; and performing the sequence control process cyclically by the central processing unit based on the stored machine language program.

BRIEF DESCRIPTION OF THE DRAWINGS

FIG. 2 is a block diagram showing a hardware configuration for implementing the control method of FIG. 1;

FIG. 3 illustrates I/O map information in the embodiment;

FIG. 6 is a flowchart showing a conventional I/O transfer process; and

FIG. 7 is a flowchart showing a conventional PC program execution process.

DESCRIPTION OF THE PREFERRED EMBODIMENT

Figure 1:
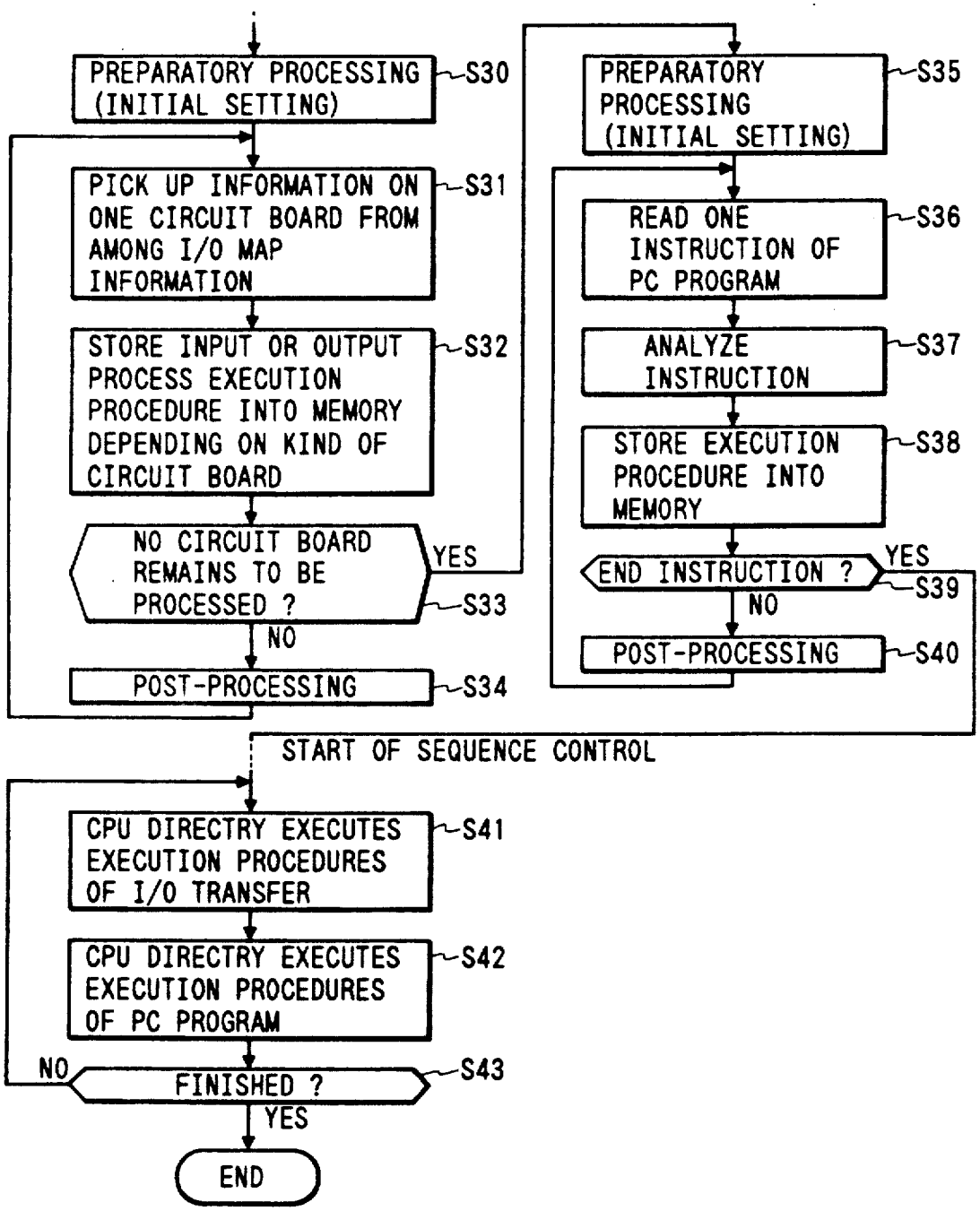
FIG. 1 is a flowchart showing a control method in a programmable controller (PC) according to an embodiment of the present invention.

FIG. 2 is a block diagram showing a hardware configuration of a programmable controller (PC) according to an embodiment of the present invention. In the figure, reference numeral 1 represents a central processing unit (CPU); 2, a ROM for storing a system program of the CPU 1; 3, a RAM for storing a user program etc.; 4, a RAM for storing I/O map information etc.; and 5, a RAM for storing I/O data corresponding to input circuit boards and output circuit boards. Reference numerals 10-14 represent the input circuit boards and output circuit boards.

FIG. 3 illustrates the I/O map information stored in the RAM 4. The I/O map information includes information indicating, on a slot-by-slot basis, the kind (i.e., input circuit board or output circuit board) of a circuit board connected to the PC and the number of its input or output points.

Figure 4:
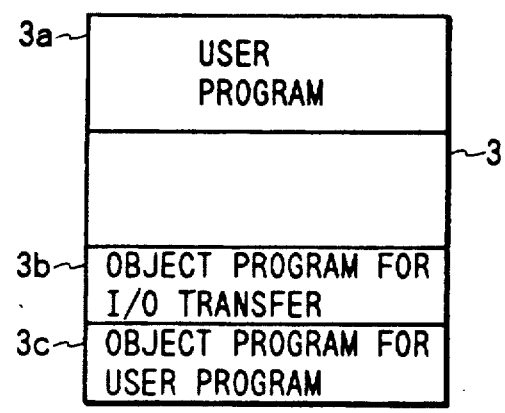
FIG. 4 illustrates how a user program and object programs are stored in a RAM in the embodiment.
Figure 5:
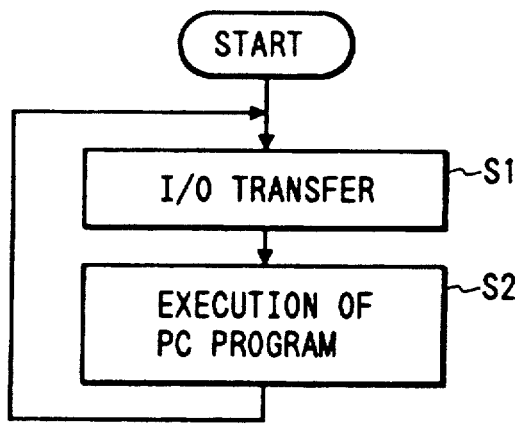
FIG. 5 is a flowchart showing a conventional sequence control method in a PC.

FIG. 4 shows how a user program 3a and object programs 3b and 3c, the latter programs being generated by executing processes described below, are stored in the RAM 3.

FIG. 1 is a flowchart showing details of a process performed while the PC of FIG. 2 is running.

First, the PC performs a process of converting execution procedures of I/O transfer. In step S30, as preparatory processing, initial setting is performed which includes setting of a read start address (e.g., a head address) of the I/O map information. Then, in step S31, information on one circuit board located at the head address of the map information is read from the RAM 4. In step S32, depending on the kind of the circuit board, an input process execution procedure or output process execution procedure is generated in the form of a machine language program which can directly be executed by the CPU 1, and stored into an area other than the user program area of the RAM 3. Further in step S32, if no circuit board remains to be processed, an execution procedure of a post-process is generated in the form of a machine language program which can directly be executed by the CPU 1, and stored into addresses after those of the above-generated machine language program of the input process execution procedure. This post-process is, for instance, a process of returning to a main routine by a jump instruction or a process of specifying an address to be accessed next. Then, it is judged in step S33 whether no circuit board remains to be processed. If it has been judged that there remains a circuit board (or boards), in step S34 post-processing is performed to renew a read address of the I/O map information and a storing address of the execution procedures, and the process returns to step S31. The above process is repeated until all the circuit boards are subjected to it, i.e., until the judgment of step S33 turns affirmative.

Next, the PC performs a process of converting a PC program. In step S35, as preparatory processing, initial setting is performed which includes setting of a read start address of the PC program stored in the RAM 3 and setting of a storing start address of an execution procedure now going to be converted and to be stored into the RAM 3. Then, one instruction located at the head of the PC program is read from the RAM 3 in step S36, and analyzed in step S37. In step S38, an execution procedure of that instruction is converted into a machine language program which can directly be executed by the CPU 1, and stored into addresses of the RAM 3 after those of the above-described I/O transfer execution procedures. Further in step S38, if the instruction is an end instruction, post-process execution procedure is generated in the form of a machine language which can directly be executed by the CPU 1, and stored into addresses after those of the machine language program of the previous instruction. This post-process is, for instance, a process of returning to the main routine by a jump instruction. Then, it is judged in step S39 whether the instruction is the end instruction. If it is not the end instruction, post-processing is performed in step S40 to renew a read address of the PC program and a storing address of the execution procedures, and the process returns to step S36. The above process is repeated until the end instruction (program completion instruction) is read out, i.e., until the judgment of step S39 turns affirmative.

After execution of the above processes, the execution procedures of the I/O transfer process and the PC program have been converted into machine language programs (object programs) 3b and 3c which can directly executed by the CPU 1, and stored in the RAM 3 as shown in FIG. 4.

When the sequence control is started, in step S41 the CPU 1 accesses the addresses of the RAM 3 in which the execution procedures of the I/O transfer process are stored, and directly executes their machine language programs to perform the input or output process. After execution of all the machine language programs of the I/O transfer execution procedures, in step S42 the CPU 1 accesses the addresses in which the execution procedures of the PC program are stored, and directly executes their machine language programs to perform the operation process of the PC program. The above I/O transfer process and the operation process of the PC program are repeatedly performed until an end instruction is provided, i.e., until the judgment of step S43 turns affirmative.

In the above embodiment, in step S32, when no circuit board remains the post-process execution procedure is generated in the form of a machine language program. Alternatively, it may be generated after the affirmative judgment of step S33. Similarly in the case of step S38, the post-process execution procedure may be generated in the form of a machine language program after the instruction is judged to be the end instruction in step S39.

While in the above embodiment the execution procedures of both of the I/O transfer process and the PC program operation process are converted into machine language programs, the execution procedures of only one of the two processes may be converted into a machine program. Even in the latter case, the processing speed can be improved compared with conventional control methods. Further, in the case where the execution procedures of both of the processes are converted into machine language programs, the order of converting the execution procedures of the two processes is not limited to that of FIG. 1, but may be reverse to the order of FIG. 1.

As described in the foregoing, according to the invention, the execution procedures of one or both of the I/O transfer process and the PC program operation process are converted in advance into a machine language program (object program), and then actually executed. As a result, the processing speed of the PC can be improved. Since the PC can be constituted of the CPU and memories and no specially designed hardware is required, the invention can be implemented inexpensively.

What is claimed is:

1. A control method in a programmable controller in which a sequence control process including an input/output transfer process and an operation process of a programmable controller program is cyclically performed, comprising the steps of:
   generating an execution procedure of the input/output transfer process in the form of a machine language program which can directly be executed by a central processing unit;
   storing the machine language program into a memory; and
   performing the sequence control process cyclically by the central processing unit based on the stored machine language program.

2. A control method in a programmable controller in which a sequence control process including an input/output transfer process and an operation process of a programmable controller program is cyclically performed, comprising the steps of:
   generating an execution procedure of the programmable controller program in the form of a machine language program which can directly be executed by a central processing unit;

storing the machine language program into a memory; and performing the sequence control process cyclically by the central processing unit based on the stored machine language program.

3. A control method in a programmable controller in which a sequence control process including an input/output transfer process and an operation process of a programmable controller program is cyclically performed, comprising the steps of:

generating execution procedures of the input/output transfer process and the programmable controller program in the form of respective machine language programs which can directly be executed by a central processing unit;

storing the machine language programs into a memory; and performing the sequence control process cyclically by the central processing unit based on the stored machine language programs.

4. The control method of claim 1, 2 or 3, wherein the generating step includes generating an execution procedure of a post-process of the input/output transfer process and/or the operation process of the programmable controller program as part of the machine language program.

* * * * *